(12) United States Patent
Nagasawa et al.

(10) Patent No.: US 6,992,831 B2
(45) Date of Patent: Jan. 31, 2006

(54) LENS SHEET AND METHOD FOR PRODUCING IT

(75) Inventors: Atsushi Nagasawa, Tsukuba (JP);
Takahiro Kitano, Tsukuba (JP);
Katsuya Fujisawa, Tsukuba (JP);
Junichi Tanaka, Tsukuba (JP);
Tatsufumi Watanabe, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/826,348

(22) Filed: Apr. 19, 2004

(65) Prior Publication Data

US 2004/0196560 A1 Oct. 7, 2004

Related U.S. Application Data

(63) Continuation of application No. 10/167,574, filed on Jun. 13, 2002, now Pat. No. 6,798,576.

(30) Foreign Application Priority Data

Jun. 13, 2001 (JP) ............................. 2001-177875
Feb. 14, 2002 (JP) ............................. 2002-046510

(51) Int. Cl.
*G02B 27/10* (2006.01)

(52) U.S. Cl. ..................... 359/619; 359/620; 359/623; 359/455

(58) Field of Classification Search ................ 359/619, 359/620, 623, 649, 618, 455, 463; 430/228, 430/302

See application file for complete search history.

(56) References Cited

U.S. PATENT DOCUMENTS

| 5,593,757 A | * | 1/1997 | Kashiwazaki et al. ... 428/195.1 |
| 5,736,278 A | * | 4/1998 | Nakazawa et al. ............. 430/7 |
| 6,294,313 B1 | * | 9/2001 | Kobayashi et al. ......... 430/302 |
| 6,475,688 B1 | * | 11/2002 | Tamura et al. ........... 430/108.3 |

* cited by examiner

*Primary Examiner*—Ricky L. Mack
*Assistant Examiner*—Brandi Thomas
(74) *Attorney, Agent, or Firm*—Oblon, Spivak, McClelland, Maier & Neustadt, P.C.

(57) ABSTRACT

The invention relates to a lens sheet applicable to a screen for a pixel type projection TV characterized in high quality and definition and a simple producing method thereof. The inventive lens sheet has a shielding layer without any axial misalignment at front and rear sides. The lens sheet comprises a lens portion with a plurality of lens elements arranged in at least one side and a shielding layer provided in a non-transmitting portion of a light radiation plane, in which the shielding layer is provided on a layer made of a cured photo-curing composition (A). The photo-curing composition (A) is composed of 100 weight parts of photo-curing resin composition (a) having a surface free energy of 30 mN/m or more and 0.01 to 10 weight parts of compound (b) having a surface free energy of 25 mN/m or less.

30 Claims, 6 Drawing Sheets

LENS SHEET AND METHOD FOR PRODUCING IT

This application is a Continuation application of U.S. Ser. No. 10/167,574, filed on Jun. 13, 2002, now U.S. Pat. No. 6,798,576.

BACKGROUND OF THE INVENTION

1. Field of the Invention

The present invention relates to a lens sheet used in a shadow mask for a display device such as a transmission screen for a projection TV, a Plasma Display Panel (PDP), a Liquid Crystal Display (LCD) and so on; and a producing method of the lens sheet. In particular, the invention relates to a method of forming a shielding layer with simple in a lens sheet having a fine pitch of 0.3 mm or less required for a pixel motor mode projection TV screen using a liquid crystal panel. Further, the invention relates to a method of forming a shielding layer in a fresnel lens which can remarkably improve contrast by reducing stray light.

2. Description of the Related Art

Figure 11:
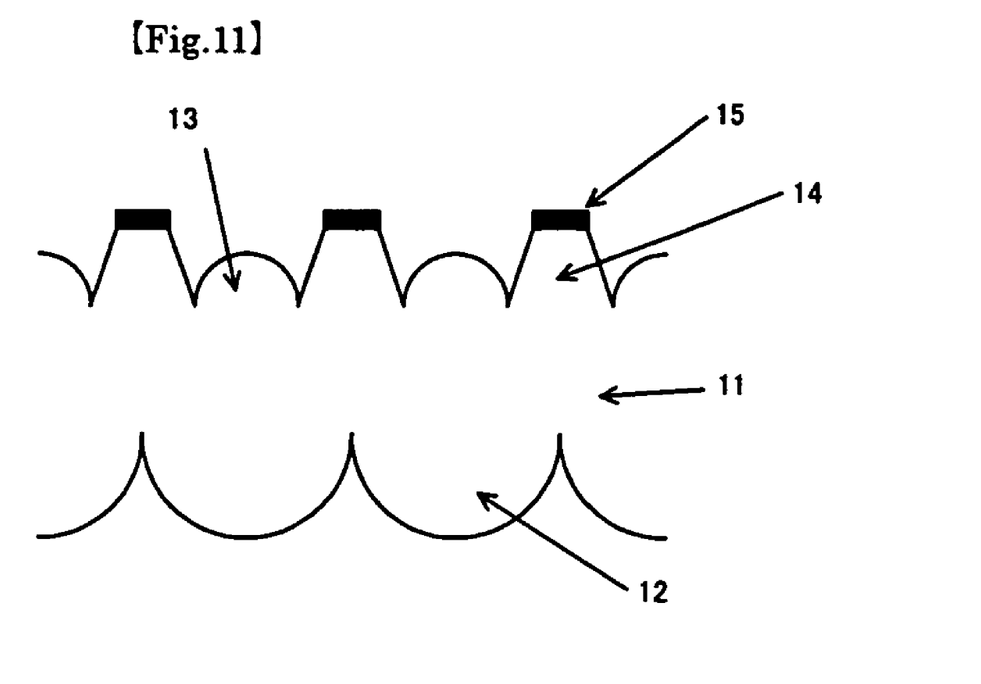
FIG. 11 illustrates a lenticular lens sheet for a CRT type projection TV.

A transmission screen used in a projection TV is generally an assembly of a fresnel lens sheet and a lenticular lens sheet. In the projection TV adopting a CRT as a light engine (hereinafter will be referred to as CRT type projection TV), the lenticular lens sheet 11 is provided with convex cylindrical lenses 12 and 13 at both planes for radiation/incidence of image light as shown in FIG. 11. The lenticular lens sheet 11 functions to compensate the color difference in RGB 3-colors from the CRT as well as enlarge the angular field of image light incident to the lenticular lens sheet from the fresnel lens sheet.

Further, the lenticular lens sheet 11 has protrusions 14 each formed in boundaries of the convex cylindrical lenses 13 and a light-absorbing shielding layer 15 each formed on the tops of the protrusions 14. The light shielding layer 15, which is generally called black stripes, can prevent reflection of any external light from an observer as well as improve the contrast of image light radiated from the lenticular lens sheet 11.

The above described lenticular lens sheet 11 is formed by pressing a transparent thermoplastic resin sheet. Alternatively, the transparent thermoplastic resin sheet undergoes molding as well as extrusion (hereinafter will be referred to as extrusion molding) to form the convex cylindrical lenses 12 and 13 and the protrusions 14. The formed lenticular lens sheet is provided with the light shielding layer 15 by selectively printing light-absorbing colored pigment only on the protrusions 14 according to various printing methods such as screen printing and gravure printing.

In forming the above described lenticular lens sheet 11, location matching between in front and rear sides, which are the convex cylindrical lenses 12 of the incidence plane and the convex cylindrical lenses 13 and the shielding layer 15 of the radiation plane, is important. If axes of the both lenses in the front and rear sides do not have positional relation corresponding to the light incident to the convex lenses on the incidence plane, the shielding layer 15 blocks radiation light to degrade the lightness of radiation thereby deteriorating screen characteristics.

The lenticular lens sheet for the CRT type projection TV adopts the above described pressing or extrusion molding so that the location is performed in a relatively easy manner at the front and rear sides of the sheet. Also, the forming can be so performed to impart sufficient screen characteristics to the sheet. Alternatively, the lenticular lens sheet may adopt a microlens array sheet where microlenses are arranged. The microlens array sheet functions to widen the angular field of the projection TV not only horizontally but also vertically. Hereinafter in the application, the convex cylindrical lens, the microlens and the fresnel lens will be generally referred to as "lens" and the lenticular lens sheet, the microlens array sheet and the fresnel lens sheet will be generally referred to as "lens sheet."

In order to obtain high quality and high definition of images, the projection TV requires to adopt an LCD projector, a Digital Micromirror Device (DMD) and so on having smaller pixels as a light engine (i.e. pixel type projection TV) rather than a CRT having larger pixels. However, when the related lens sheet for the CRT type projection TV is diverted into the pixel type projection TV, interference fringes (i.e. moire) are created as a drawback since the size of the pixels projected on the screen is similar to the pitch of lenses in the lens sheet. Therefore, in the lens sheet for the pixel type projection TV, the lenses are required to have a fine pitch, in particular at 0.3 mm or smaller, in order to prevent the moire between the lenses and the pixels projected on the screen.

It is necessary to mold both sides of the lens sheet in the related method for forming a shielding portion by printing convex or concave regions in respect to the concave and convex pattern of the radiation plane in the lenticular lens sheet. However, in the pressing or extrusion molding, it is extremely difficult to form the fine-pitched lenticular lens sheet through the extrusion molding on both sides by the following reason. The fine pitch tends to degrade the molding rate of lens or incur axial deviation at the front and rear sides.

Accordingly, it has been often considered a technique for radiating light from the side of a related lens plane to activate a photosensitive layer applied to the opposite side in order to install a shielding layer only in a non-radiating portion which will not radiate light. Japanese Laid-Open Patent Application No. S59-121033 and H9-120101 disclose methods of blacking a tacky labyrinthine light portion by radiating light from the lens plane side to a positive photosensitive resin layer applied to the opposite side of the lens plane to cure the resin layer, and then printing powder colorant or black pigment or attaching a transfer film printed with black pigment to the photosensitive resin layer. However, those methods have problems that an additional process step is necessary to remove the colorant or pigment from the light condensing portion and a large amount of substrate film used as the transfer film heavily burdens the environment with waste materials. Further, it is difficult to completely remove the pigment or colorant from the light condensing portion. Also, Japanese Laid-Open Patent Application No. 2000-2802 discloses a method of providing a shielding layer by controlling hydrophilicity on the surface with photo-catalyst. However, since the light condensing portion of the lens becomes hydrophilic according to this method, the whole surface of the light condensing portion is printed after applying water. So, an additional process step is required to remove ink from a portion where water is applied thereby sophisticating the whole process.

Figure 7:
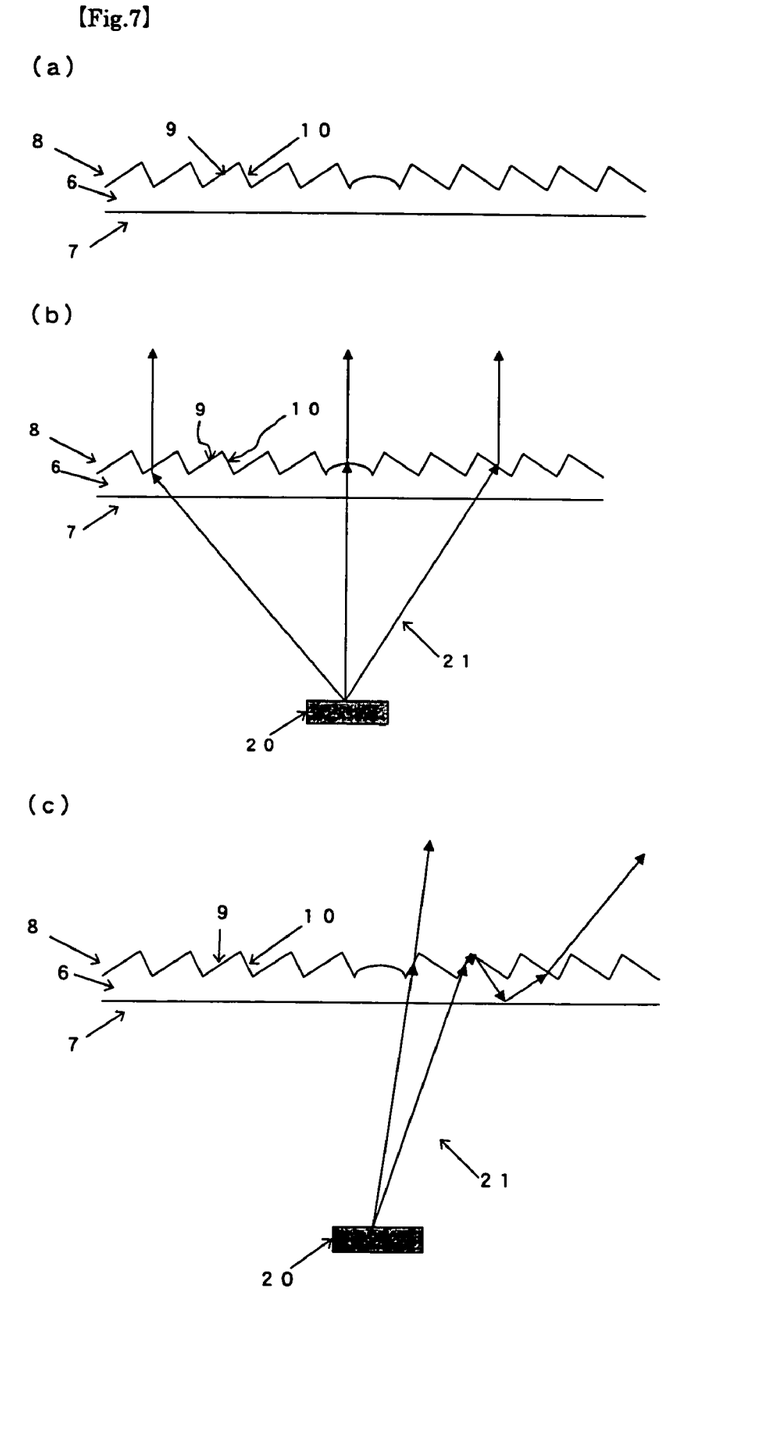
FIG. 7 illustrates a conventional fresnel lens sheet and a function thereof.

In the meantime, as shown in FIG. 7A, a typical fresnel lens sheet 6 includes a flat incidence plane 7 of image light and a radiation plane 8 constituted of fresnel lens faces 9 and rising faces 10. As shown in FIG. 7B, image light 21 from a light engine 20 is incident on the fresnel lens sheet 6 as spreading. Therefore, the inside of the image light 21 is mostly radiated from the fresnel lens 9 to a lenticular lens sheet (not shown). However, as shown in FIG. 7C, the smallest portion inside the incident image light 21 reaches the rising faces 10 instead of fresnel lens faces 9. After reaching the rising faces 10, the image light directly radiates toward the lenticular lens sheet or reflects from the rising faces 10 before radiates from the fresnel lens faces 9. Such image light is called stray light since it may not be perpendicularly incident to the lenticular lens sheet. The stray light mixes noise into the regular image light to degrade the contrast of the projection TV. Known in the art is a technique for installing a light absorbing layer or a light scattering layer on the rising faces in order to restrain the stray light from occurring. (Refer to Japanese Laid-Open Patent Application No. S50-123448, Japanese Laid-Open Patent Application No. S52-143847, Japanese Laid-Open Patent Application No. S62-251701, Japanese Laid-Open Patent Application No. S62-251702 and so on.) However, it is difficult to install the light absorbing layer only on the rising faces, and even if properly installed, the manipulation is troublesome as drawbacks.

SUMMARY OF THE INVENTION

It is an object of the present invention to provide a lens sheet applicable to a screen for a pixel type projection TV and a simple producing method thereof, in which a shielding layer is formed without any axial deviation on front and rear sides of the sheet.

It is another object of the invention to provide a fresnel lens sheet and a simple producing method thereof, in which the fresnel lens sheet is attached with a shielding layer capable of remarkably enhancing the contrast of a projection TV by reducing stray light radiated from the fresnel lens sheet.

To achieve the above object, there is provided a lens sheet comprising a lens portion with a plurality of lens elements arranged in at least one side and a shielding layer provided in a non-transmitting portion of a light radiation plane, wherein the shielding layer is provided on a layer made of a cured photo-curing composition (A), wherein the photo-curing composition (A) is composed of 100 weight parts of photo-curing resin composition (a) having a surface free energy of 30 mN/m or more and 0.01 to 10 weight parts of compound (b) having a surface free energy of 25 mN/m or less.

In another aspect of the present invention, there is provided a lens sheet comprising a lens portion with a plurality of lens elements arranged in at least one side and a shielding layer provided in a non-transmitting portion of a light radiation plane, wherein the shielding layer is provided on a layer made of a cured photo-curing composition (A), wherein a light transmitting portion in the layer of the photo-curing composition (A) has a surface free energy of 25 mN/m or less.

In yet another aspect of the present invention, there is provided a method of producing a lens sheet which includes a lens portion with a plurality of lens elements arranged in at least one side and a shielding layer provided in a non-transmitting portion of a light radiation plane, the method comprising the following steps of: coating photo-curing composition (A) on a light radiation plane of the lens sheet to form a layer made of the photo-curing composition (A), the photo-curing composition (A) being composed of 100 weight parts of photo-curing resin composition (a) having a surface free energy of 30 mN/m or more and 0.01 to 10 weight parts of compound (b) having a surface free energy of 25 mN/m or less; radiating light from the side opposite to the layer of the photo-curing composition (A) to selectively cure a light transmitting portion of the layer of the photo-curing composition (A) with the layer of the photo-curing composition (A) being contacted with a medium having surface free energy lower than that of the compound (b); and painting colored pigment on the layer of the photo-curing composition (A) to form a shielding layer in a non-transmitting portion of light.

The method of the invention further comprising the step of: radiating light from the side opposite to the layer of the photo-curing composition (A) to cure an uncured portion of the layer of the photo-curing composition (A) with the layer of the photo-curing composition (A) being contacted with a medium having surface free energy higher than that of the photo-curing resin composition (a) between said step of radiating light from the side opposite to the layer of the photo-curing composition (A) to selectively cure a light-transmitting portion of the layer of the photo-curing composition (A) and said step of forming a shielding layer.

Herein, the value of the surface free energy in the specification is the value at temperature 20° C., relative humidity 50 percent, and measured by the method described below.

Figure 5:
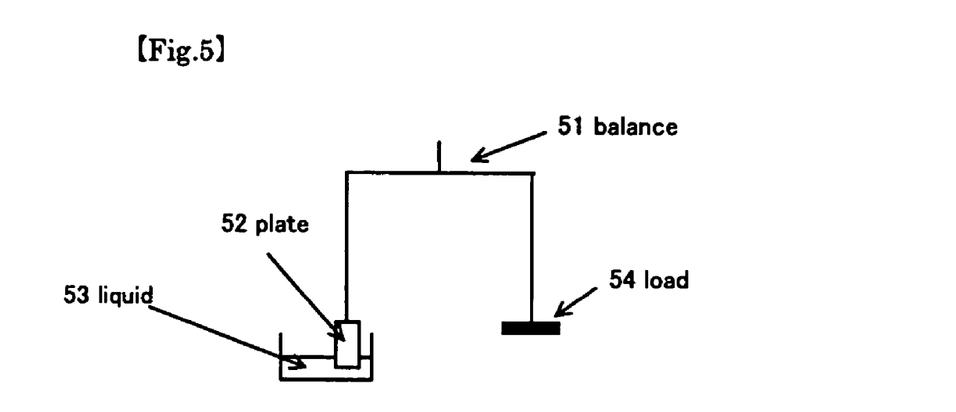
FIG. 5 illustrates the Wilhelmy method.

There are various methods for measuring the surface free energy of a liquid, but in this specification, the values measured by the Wilhelmy method at a temperature of 20° C. and a relative humidity of 50 percent were used as the surface free energy. The measuring principle of the Wilhelmy method is as follows. As shown in FIG. 5, a plate 52 is suspended from one arm of a balance 51, one end is immersed in a liquid 53 to be measured, a suitable load 54 is attached to the other end and the balance 51 is adjusted. In addition to gravity and buoyancy, the plate 52 is also subject to a force in the downward direction from the measurement liquid 53, so the following equation (1) may be written for the equilibrium state:

Load 54=Weight of plate 52−Buoyancy of plate 52+Force from liquid surface    (1)

As the force due to the liquid surface is equivalent to the surface tension (=surface free energy of the liquid), the surface free energy of the liquid can be obtained by measuring the force due to the liquid surface. The material of the plate 52 may be platinum or glass, etc., and as the surface free energy does not change, it may be a material which is not corroded by the measurement liquid 53. In the measurements according to the specification, platinum is used as the material of the plate 52.

Figure 6:
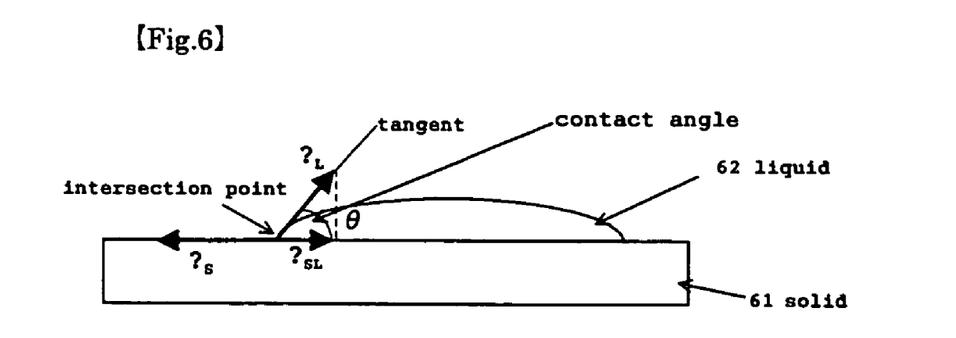
FIG. 6 illustrates a method for measuring surface free energy of solid.

The surface free energy of the solid cannot be measured directly, but the surface free energy can be found using various types of liquid known in the art. A liquid drop on a solid surface has the cross-sectional shape shown in FIG. 6. In the figure, a contact angle is an angle subtended by a tangent to the liquid 62 and the side of the surface of the solid 61 in contact with the liquid 62, at an intersection point between the surface of the liquid 62 on the surface of the solid 61, and the surface of the solid 61. Let this angle be ?. The following equation (2) (Young's equation) is then satisfied due to the equilibrium conditions at the intersection point:

$\gamma_S = \gamma_{SL} + \gamma_L \cdot \cos \theta$    (2)

Here, $\gamma_S$ is the surface free energy of the solid, $\gamma_L$ is the surface free energy of the liquid, and $\gamma_{SL}$ is the surface free energy of the solid/liquid interface.

The surface free energy $\gamma$ is represented by the sum of the dispersion force component $\gamma^a$, polar force component $\gamma^b$ and hydrogen bond force component $\gamma^c$, so the following assumption (3) can be made regarding the surface free energy of the solid/liquid interface $\gamma_{SL}$:

$$\gamma_{SL}=\gamma_S+\gamma_L-2(\gamma_S^a\gamma_L^a)^{1/2}-2(\gamma_S^b\gamma_L^b)^{1/2}-2(\gamma_S^c\gamma_L^c) \tag{3}$$

Therefore, if the value ? of the contact angle is found for three or more liquids having different free surface energies under the conditions of temperature 20° C. and relative humidity 50%, $\gamma_S^a$, $\gamma_S^b$, $\gamma_S^c$ can be deduced by solving the equation with three unknowns derived from equation (2) and equation (3), and the surface free energy of the solid $\gamma_S$ can be found as their sum.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 3:
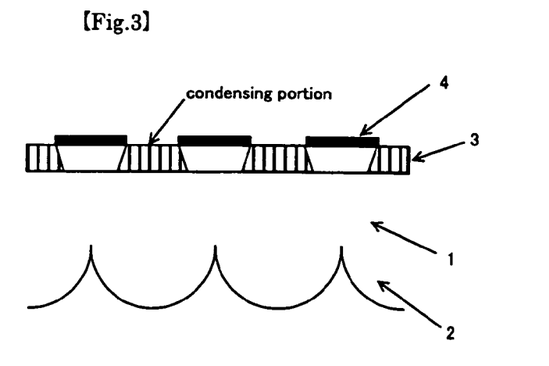
FIG. 3 illustrates another embodiment of the invention.

FIG. 3 schematically illustrates a lenticular lens sheet as an exemplary lens sheet of the invention. The lenticular lens sheet 1 includes a layer 3 composed of a photo-curing composition (A) and a shielding layer 4 in a plane opposed to a lens portion where convex lenses 2 are arranged, in which the layer 3 of the photo-curing composition (A) has a surface free energy of 25 mN/m or less in openings of the shielding layer 4, i.e. condensing portions, as light-transmitting portions, of the convex lenses.

Although the lens sheet as set forth in FIG. 3 includes a group of the convex cylindrical lenses 2 which are one-dimensionally arranged in the lens portion, the lens sheet may adopt a microlens array including a group of convex lenses which are two-dimensionally arranged. With regard to the transmissivity of image light, it is preferred that the microlens array is arranged in a closest packing (so-called delta packing) or packing corresponding to a pixel array in a display device. The lens sheet of the invention can be readily obtained according to the press molding of transparent thermoplastic resin, the extrusion molding or the 2P molding method using photo-curing resin.

Figure 8:
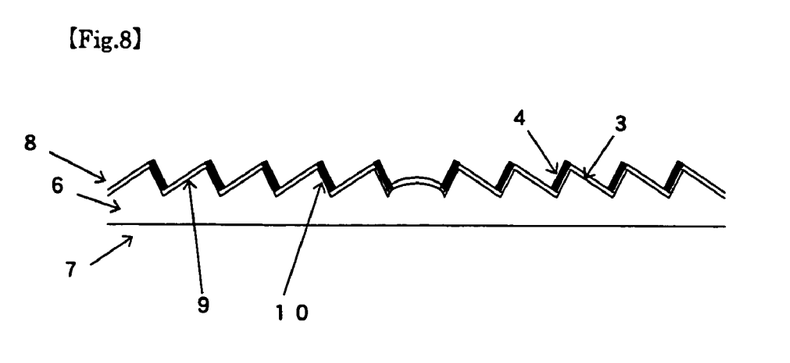
FIG. 8 illustrates a fresnel lens sheet of the invention.

FIG. 8 is a perspective view of a fresnel lens sheet 6 as exemplary lens sheet of the invention. The fresnel lens sheet 6 of the invention has a flat incidence plane 7 and a radiation plane 8 opposed to the incidence plane 7. The radiation plane 8 is constituted of fresnel lens faces 9, as light-transmitting portions, and rising faces 10, as non-transmitting portions. A layer 3 of a photo-curing composition (A) is applied on the fresnel lens faces 9 and the rising faces 10. A shielding layer 4 is applied to the photo-curing composition layer 3 on the rising faces 10. The photo-curing composition layer 3 has a surface free energy of 25 mN/m or less in openings of the shielding layer 4, i.e. on the fresnel lens surfaces 9. Further, the fresnel lens sheet 6 is readily formed via the press molding of transparent thermoplastic resin or the 2P molding method using photo-curing resin.

In the invention, the above described photo-curing composition (A) adopts a composition composed of a photo-curing resin composition (a) and a compound (b) with a low surface free energy, which will be described hereinafter. The photo-curing resin composition (a) used for obtaining the object of the invention has a surface free energy of 30 mN/m or more, and preferably 40 mN/m or more. Further, the compound (b) has a surface free energy of 25 mN/m or less, and preferably 20 mN/m or less. In order to obtain the object of the invention, 0.01 to 10 weight parts of the compound (b) is preferably mixed per 100 weight parts of the photo-curing resin composition (a).

The inventors have observed that surfaces each having low and high surface free energy can be obtained from the photo-curing composition (A) composed of the photo-curing resin composition (a) and the compound (b) as set forth above. A surface having a low surface free energy is obtained by curing the photo-curing composition (A) while radiating light to the same in a medium having a low surface free energy. Also, a surface having a high surface free energy can be obtained by curing the photo-curing composition (A) while radiating light to the same in a medium having a high surface free energy. Further, the inventors have found that the surface free energy of the photo-curing composition (A) is dependent to the contacting medium in the uncured state of the composition (A). Examples of radiated light may include visible light, ultraviolet ray and so on, and preferably, ultraviolet ray since it has high energy which is advantageous for curing the photo-curing composition (A).

It can be supposed that the above described surface reforming is revealed according to the following mechanism. The interface between a medium and the composition composed of the photo-curing resin composition (a) and the compound (b) is energetically stabilized when the difference in the surface free energy between them is minimized. Since the compound (b) in the photo-curing composition (A) is lower in the surface free energy than the photo-curing resin composition (a), a stable state is obtained by the compound (b) existing in the interface when the composition (A) contacts with a medium having a low surface free energy. On the contrary, when the composition (A) contacts with a medium having a high surface free energy, it is more energetically stable if the photo-curing resin composition (a) exists in the interface rather than the compound (b) so that the compound (b) does not exist in the interference. That is to say, the photo-curing resin composition (A) undergoes phase transition due to the difference of the medium in an uncured state. Therefore, the surfaces having the different surface free energies can be obtained by fixing the state in the interface through radiation of light into the photo-curing composition (A) in the media having the different surface free energies.

Further, the above-described phase transition can be carried out reversibly in the uncured state of the photo-curing composition (A). When the photo-curing composition (A) is surface refined into high and low surface free energy areas, a proper area is selectively refined into the high surface free energy area before the remaining area is refined into the low surface free energy area. On the contrary, after a proper area is selectively refined into the low surface free energy area, the remaining area is refined into the high surface free energy area.

The medium of high surface free energy may be water or a higher alcohol such as glycerine, and the medium of low surface free energy may be atmospheric air or an inert gas such as helium or argon, but the invention is not limited to these. In particular, since the invention can utilize water as the high surface free energy medium and the air as the low surface free energy medium, it is preferable with regard to cost and environment.

The compound (b) having a surface free energy of 25 mN/m or less in this invention may be a silicon-containing polymer compound, for example a silicone oil such as polydimethylsiloxane or a modified silicone oil wherein the side chain or end group of the silicone oil is modified by an amino group or an epoxy group, an alkoxysilane such as tetramethoxysilane or phenyltrimethoxysilane, or a fluorine-containing (polymer) compound such as a fluoroalkylsilane or a polymer compound containing a trifluoroalkyl group; a block co-polymer including above described compound as an ingredient, a graft co-polymer, a random co-polymer and so on, but the invention is not limited to above described compound.

The photo-curing resin composition (a) used in the invention includes polymeric monomer and other components such as photo-polymerization initiator corresponding to as desired. (Exclude the compound (b) having the surface free energy 25 mN/m or less as set forth above.) In general, the polymeric monomer may utilize a photo-polymerizable ethylene-based unsaturated compound having a surface free energy of 30 mN/m or more and at least one ethylene-based double bond in molecule. Alternatively, an epoxy-based or oxetane-based compound capable of photo-cationic-polymerization may be added.

The ethylene-based unsaturated compounds capable of photo-polymerization used in this invention is a monofunctional (meth)acrylate monomer such as (meth)acrylic acid, methyl (meth)acrylate, ethyl (meth)acrylate, propyl (meth)acrylate, n-butyl (meth)acrylate, t-butyl (meth)acrylate, 2-ethylhexyl (meth)acrylate, benzyl (meth)acrylate, glycidyl (meth)acrylate, tetrahydrofurfuryl (meth)acrylate and 2-hydroxyethyl (meth)acrylate; a vinyl monomer such as N-vinyl pyrrolidone, N-vinyl imidazole, N-vinyl caprolactam, styrene, a-methylstyrene, vinyltoluene, allyl acetate, vinyl acetate, vinyl propionate or vinyl benzoate; a bifunctional (meth)acrylate monomer such as 1,4-butane diol di(meth)acrylate, 1,6-hexane diol di(meth)acrylate, 1,9-nonane diol di(meth)acrylate, ethylene glycol di(meth)acrylate and polyethylene glycol di(meth)acrylate; and polyfunctional (meth)acrylate monomers such as trimethylolpropane tri(meth)acrylate, pentaerythrytol tri(meth)acrylate, pentaerythrytol tetra(meth)acrylate, pentaerythrytol penta(meth)acrylate, dipentaerythrytol hexa(meth)acrylate, tri(meth)acryloylcyanurate, tri(meth)acryloyl isocyanurate, triaryl cyanurate, triaryl isocyanurate and 1,3,5-tri(meth)acryloyl hexahydro-s-hydrazine, one or more of these compounds being used. In the above, "(meth)acrylic acid" refers to "acrylic acid" and "methacrylic acid", "(meth)acrylate" refers to "acrylate" and "methacrylate", and "(meth)acryloyl" refers to "acryloyl" and "methacryloyl".

A photo-polymerization initiator may also be added if necessary. The photo-polymerization initiator may for example be 2,2-dimethoxy-2-phenylacetone, acetophenone, benzophenone, xanthofluoroenone, benzaldehyde, anthraquinone, 1-(4-isopropylphenyl)-2-hydroxy-2-methyl-propane-1-one, 1-hydroxy-cyclohexyl-phenyl-ketone, 2,4-diethylthioxanthone, camphor quinone, and 2-methyl-1-[4-(methylthio)phenyl]-2-morpholino propane-1-one.

Moreover, if necessary, organic solvents such as acetone, ethanol, methanol, isopropyl alcohol, hexane, ethyl acetate, chloroform, carbon tetrachloride, tetrahydrofuran, diethyl ether, methyl ethyl ketone, toluene and benzene may be used as diluent of the photo-curing composition (A).

Figure 12:
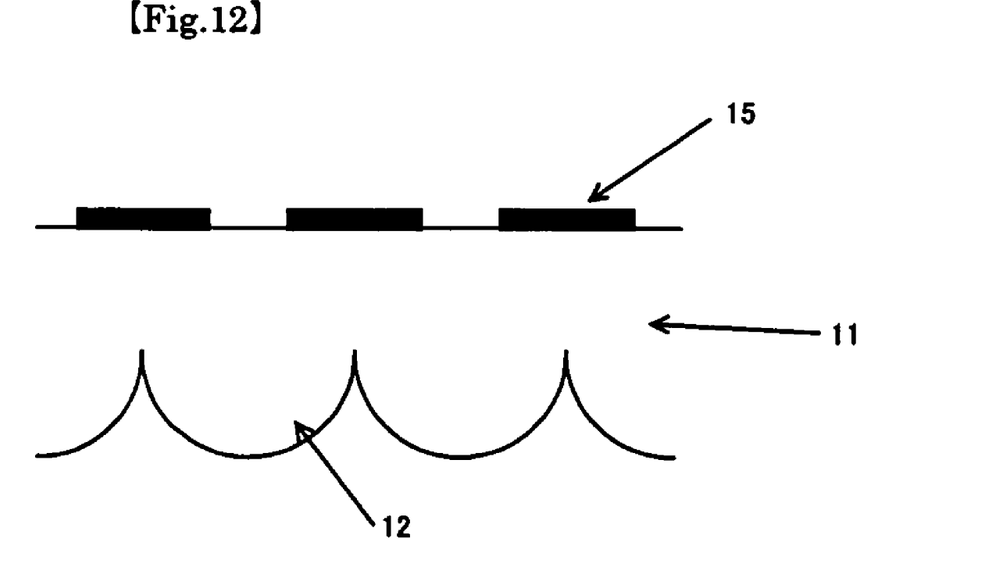
FIG. 12 illustrates a lens sheet for pixel type projection TV.

The lens sheet of the invention is applied to the lenticular lens sheet and fresnel lens sheet used in the transmission screen for the projection TV, and the shadow mask for the pixel type flat panel display such as the PDP and the liquid crystal panel. The lenticular lens sheet is substrate shaped and may have an uneven or curved face in the radiation plane. When the liquid crystal projector is adopted as a light engine, since the compensation due to the difference in the RGB 3-color is not necessary, the lens is installed only in the incidence plane of image light but not in the radiation plane of image light, as shown in FIG. 12, thereby allowing the radiation plane to be flat.

Figure 1:
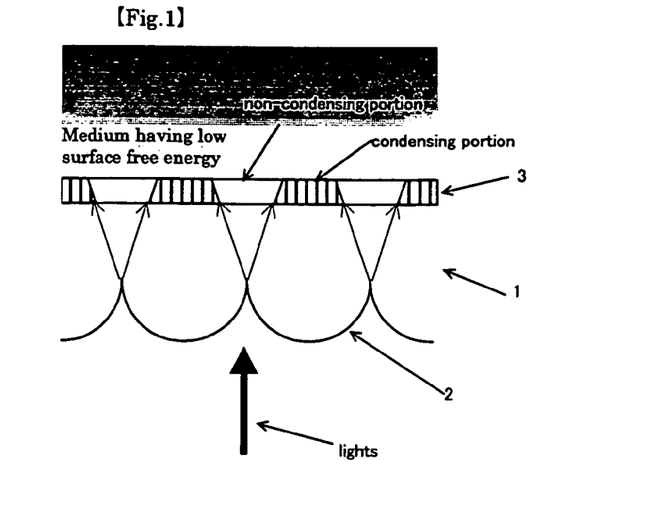
FIG. 1 illustrates curing of photo-curing composition (A) in a medium of a low surface free energy.

If the lens sheet is the lenticular lens sheet, it can be manufactured according to the following method. First, as shown in FIG. 1, the above photo-curing composition (A) is coated on the radiation plane of the lens sheet 1. As contacting with a medium (e.g. the air) having a surface free energy lower than that of the compound (b), light is radiated to the lens sheet 1 from the side of the convex lenses 2. The radiated light is condensed by the convex lenses 2 to selectively cure the photo-curing composition (A) on condensing portions (i.e. light transmitting portions) as indicated as vertical patterns in the drawing. The above-described method can produce a lens sheet including light transmitting portion having surface energy of 25 mN/m or less. Preferably, the light radiated from the lens portion propagates substantially in a parallel direction. The light propagating substantially in a parallel direction can be obtained with a collimater lens by collimating light radiated from a light source that can be regarded as a point light source. Alternatively, the light propagating substantially in a parallel direction can be similarly reproduced by scanning light obtained with a double slit or double pinhole. In a lens sheet used for the transmission screen available for the image display device which projects an image from backside, it is preferable that light radiated from the lens portion propagates substantially in the same direction as projection light of the image. The light propagating substantially in the same direction as the projection light of the image can by obtained with a projection system which is equivalent to that used in the image display device.

Figure 2:
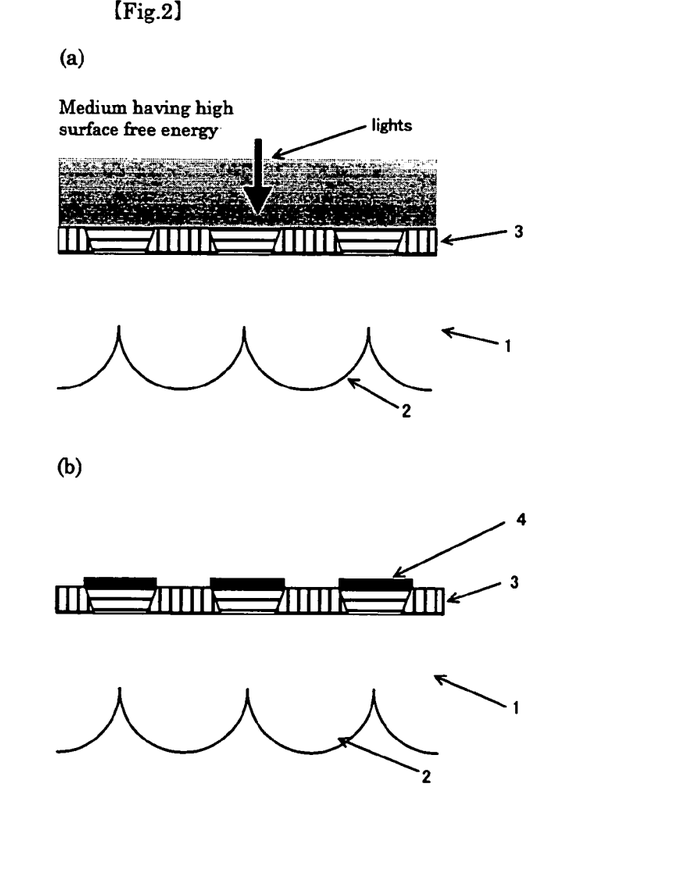
FIG. 2 illustrates an embodiment of the invention.

Then, as shown in FIG. 2A, as the resultant lens sheet 1 is contacted with a medium (e.g. water) which has a higher surface free energy than the photo-curing resin composition (a), light is radiated to the radiation plane of the lens sheet 1 to cure the uncured photo-curing composition (A) (indicated as horizontal patterns in the drawing).

According to the above-described process, surfaces of the condensing portion and the non-condensing portion (i.e. light non-transmitting portion) in the radiation plane of the lens sheet were respectively reformed into a low surface free energy area and a high surface free energy area. Preferably, the non-condensing portion has the surface free energy higher than the condensing portion for at least 5 mN/m with regard to the formation of the shielding layer 4.

Those surfaces of various surface free energies have different wetting properties in respect to various liquids. In a general solvent or paint, if the surface free energy is higher, the surface is more wettable to the paint. Therefore, the non-condensing portion is more wettable than the condensing portion in the lens sheet 1. The shielding layer 4 can be so formed that colored pigment is selectively applied to the non-condensing portion (shown in FIG. 2B) by painting the colored pigment on the surface reformed sheet 1 based upon this property.

Further, as shown in FIG. 1, after the photo-curing composition (A) is coated on the radiation plane of the lens sheet 1, light is radiated to the lens sheet 1 from the side of the convex lens 2 as contacting with a medium (e.g. the air) having a surface free energy lower than the compound (b) so as to selectively cure the photo-curing composition (A) (indicated as vertical patterns in the drawing) in the condensing portion. Then, the colored pigment may be painted as shown in FIG. 3 to form the shielding layer 4. The colored pigment is cured after painting. Light may be radiated to the lens sheet 1 from the side of the colored pigment to cure the uncured photo-curing composition (A).

As set forth above, the shielding layer 4 can be formed by curing the colored pigment after almost completely exposing the layer 3 of the photo-curing composition (A) because of repelling the colored pigment painted on the photo-curing composition layer 3 of the lower surface free energy (25 mN/m or less) in the condensing portion from there. Herein the almost completely exposed state of the photo-curing composition layer 3 means that the colored pigment is removed from the photo-curing composition layer 3 in so much as to sufficiently obtain the object of the resultant lens sheet 1.

Figure 4:
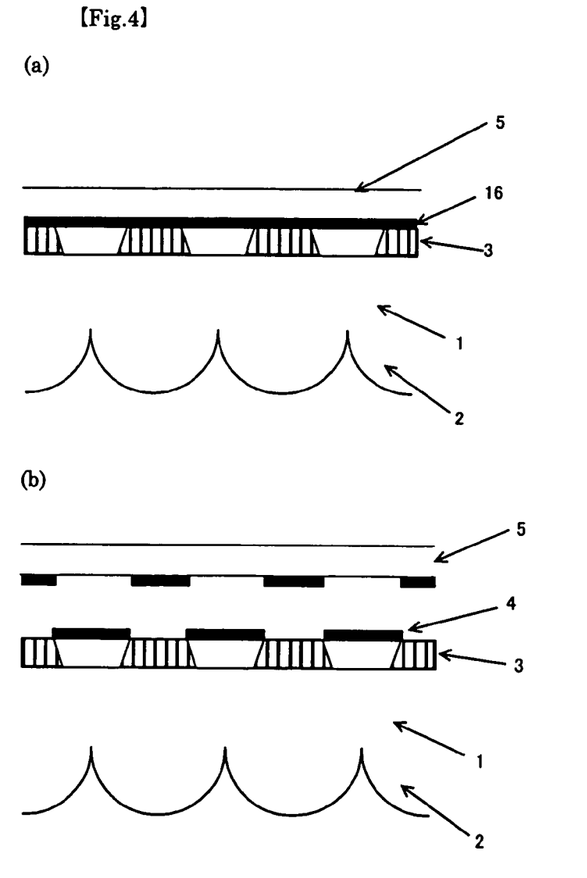
FIG. 4 illustrates a further another embodiment of the invention.

Further, using a high viscous colored pigment may utilize repelling of the colored pigment from the light condensing portion as set forth above. However, since the high viscous colored pigment has a low fluidity, this requires a long time until the colored pigment is completely repelled. In this case, as shown in FIG. 4A, after the high viscous colored pigment is painted on the cured surface of the layer 3 of the photo-curing composition (A), a substrate 5 is closely contacted to the colored pigment. The substrate 5 has excellent adhering property to the colored pigment. Then, the colored pigment is cured and selectively removed from the light condensing portion, as shown in FIG. 4B, thereby to form the shielding layer 4. Further, the colored pigment can be selectively removed from the light condensing portion via physical means such as airflow, water flow and blast. Though the process of removing the colored pigment cannot be omitted, the colored pigment can be readily removed since the colored pigment has a low bond strength to the light condensing portion. This improves the workability of the process.

Further, when the photo-curing colored pigment is used in the invention, the shielding layer can be formed according to the following process. First, the photo-curing colored pigment is painted on a peelable sheet at a proper thickness, and the light condensing portion of the lens is attached to the lens sheet which is surface reformed to a low surface free energy area. A non-condensing portion of the lens may be surface reformed to a high surface free energy area or left as unprocessed. Then, the photo-curing colored pigment in the condensing portion is cured by radiating light substantially in parallel from the lens portion. Finally, the peelable sheet is peeled from the lens sheet to obtain the shielding layer in the lens sheet.

Further, the above methods used in producing of the lenticular lens sheet can be applied to producing of the micro lens array sheet.

Figure 9:
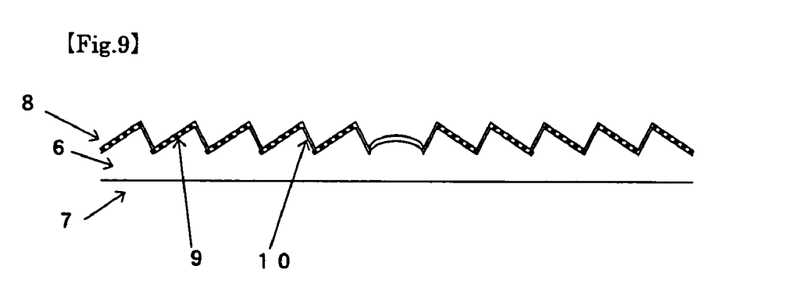
FIG. 9 illustrates another embodiment of the invention.

When the fresnel lens sheet is adopted as the lens sheet, the lens sheet can be produced according to the following method. First, as shown in FIG. 9, the photo-curing composition (A) is coated on the radiation plane 8 of the fresnel lens sheet 6 via a spin coat or dip coat to radiate light from the incidence plane 2 as the lens sheet 6 contacting with a medium (e.g. the air) having a free energy lower than the compound (b). The radiation light is preferably radiated from a light source that can be regarded as a point light source 20. This allows the fresnel lens sheet to be radiated with light substantially the same as the projection light of image which is used in the projection TV. Therefore, the light is mostly radiated to the fresnel lens plane 9 (i.e. light transmitting portion) while only a small amount of light is radiated to the rising faces 10 (i.e. light non-transmitting portion). The quantity of light radiation is so adjusted that the fresnel lens 9 is radiated with the light for the critical exposure index or more. This facilitates the quantity of light radiation to be easily adjusted under the critical exposure index in the rising faces 10. Here, the critical exposure means a lower value of the amount of light required to cure the photo-curing composition (A). That is to say, the photo-curing composition (A) on the fresnel lens plane 9 is selectively cured (indicated as dotted lines in FIG. 9) and the photo-curing composition (A) on the rising faces 10 remains uncured.

Figure 10:
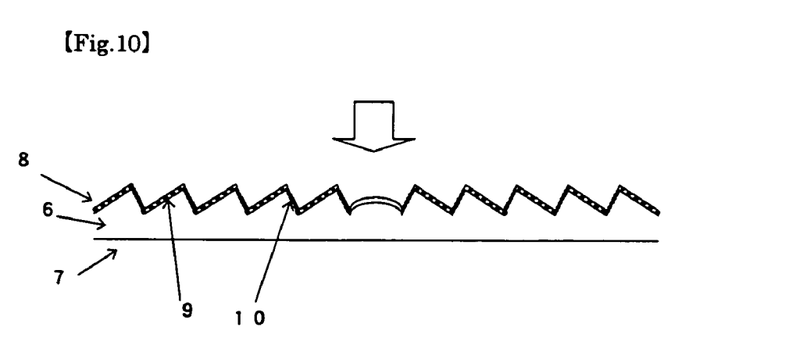
FIG. 10 illustrates still another embodiment of the invention.

Then, as shown in FIG. 10, the resultant fresnel lens sheet 6 is radiated with light from the side of the radiation plane 8 of the fresnel sheet 6 as contacting with a medium (e.g. water) having a surface free energy higher than the photo-curing resin composition (a) so as to selectively cure the uncured photo-curing composition (A) (indicated as gray lines in FIG. 10).

According to the above-described process, the fresnel lens faces 9 and the rising faces 10 in the radiation plane 8 of the fresnel lens sheet 6 were respectively reformed into a low surface free energy area and a high surface free energy area. Preferably, the rising faces 10 have the surface free energy higher than the fresnel lens faces 9 for at least 5 mN/m with regard to the formation of the shielding layer 4.

Those surfaces of various surface free energy have different wetting properties in respect to various liquids. In a general solvent or paint, if the surface free energy is higher, the surface is more wettable to the paint. Therefore, the surface reformed fresnel sheet 6 is more wettable in the rising faces 10 than the fresnel lens faces 9. The shielding layer 4 can be so formed that colored pigment is selectively applied to the rising faces 10 by painting the colored pigment on the surface reformed fresnel lens sheet 6 based upon this property. Further, the above methods used in manufacture of the lenticular lens sheet can be applied to producing of the fresnel lens sheet.

Examples of the colored pigment adopted in the invention may include gravure ink, flexographic ink, screen ink, offset ink, letterpress ink and so on. With regard to contrast improvement, the colored pigment is preferably black. The colored pigment is obtained from oil fat component such as drying oil and non-drying oil, resin component such as synthetic resin and natural resin, at least one selected from solvent components including hydrocarbon, ketone, alcohol and so on, mixture of photo-polymerizable monomer and photo-polymerization initiator and colorant. Examples of the colorant may include black dye such as aniline black and black pigment such as carbon black, acetylene black, and lamp black and mineral black.

EXAMPLES

Now, the detailed embodiments of the present invention will be described hereinafter.

Example 1

A lenticular lens sheet is produced via the 2P molding with a lens-forming roll engraved with a negative shape of the lenticular lens which is constituted of convex cylindrical lenses having a pitch of 0.3 mm. A substrate film utilizes a 0.25 mm thick polyethylene terephthalate(PET)film (COSMOSHINE A4300) available from TOYOBO Co., Ltd. and a 2P resin utilizes an acrylate UV-curing resin (Aronix) available from Toagosei Co., Ltd.

60 weight parts of dipentaerythrytol hexa-acrylate "KAYARAD DPHA" (trade name; product by NIPPON KAYAKU CO.,LTD.), 40 weight parts of ethylene oxide-modified triacrylic isocyanurate "Aronix M-315" (trade name; product by TOAGOSEI CO.,LTD.), 1 weight part of 2,4-diethylthioxanthone (product by NIPPON KAYAKU CO., LTD.) and 3 weight parts of 2-methyl-1-[4-(methylthio)phenyl]-2-morpholino propane-1-one "Irugacure 907" (trade name; product by Chiba Speciality Chemicals Inc.), were mixed to manufacture a photo-curing resin composition (a). The surface free energy of the photo-curing resin composition (a) was measured by the Wilhelmy method and found to be 42.6 mN/m. The photo-curing resin composition (a) is added with 0.5 weight parts of a low surface free energy compound (b) to produce a photo-curing composition (A). The low surface free energy compound (b) utilizes amino-denatured silicon oil (KF857) having the surface free energy 20.7 mN/m measured via the Wilhelmy method, available from Shin-Etsu Chemical Co., Ltd. The photo-curing composition (A) is diluted into a concentration of 5 wt % with toluene since it shows poor workability with regard to coating ability due to high viscosity. The diluted photo-curing composition (A) is uniformly applied with a thickness of 0.001 mm on a PET film by volatilizing the toluene, after coating the photo-curing composition (A) on the PET film with a thickness of 0.02 mm by using the bar coater. The resultant film is halved: One is in the air and the other one is submerged into water, then they are UV-radiated with a high-pressure mercury lamp. In the resultant film, contact angles of the surface are measured in respect to various solvents with a contact angle meter available from Kyowa Interface Science Co., Ltd. Results are shown in Table 1.

TABLE 1

| Curing environment | Solvent | | | |
| --- | --- | --- | --- | --- |
|  | Water | Ethylene glycol | Dipropylene glycol | Toluene |
| Atmosphere | 104° | 81° | 59° | 25° |
| Water | 61° | 34° | 0° | 0° |

Surface free energy of solvents, $\gamma_L$

Water: 72.8 mN/m ($\gamma_L^a$: 29.1 mN/m, $\gamma_L^b$: 1.3 mN/m, $\gamma_L^c$: 42.4 mN/m)

Ethylene glycol: 47.7 mN/m ($\gamma_L^a$: 30.1 mN/m, $\gamma_L^b$: 0 mN/m, $\gamma_L^c$: 17.6 mN/m)

Dipropylene glycol: 33.9 mN/m ($\gamma_L^a$: 29.4 mN/m, $\gamma_L^b$: 0 mN/m, $\gamma_L^c$: 4.5 mN/m)

Toluene: 27.9 mN/m ($\gamma_L^a$: 27.9 mN/M, $\gamma_L^b$: 0 mN/M, $\gamma_L^c$: 0 mN/m)

(All values at 20° C. From Journal of Adhesion, 8,131 (1972).

From the results of Table 1, the surface free energies when curing was performed in the atmosphere and when it was performed in water were respectively computed to be 21.5 mN/m and 40.2 mN/m. From this, it was found that a surface free energy of a surface, which was obtained by curing in water, was different from that of a surface, which was obtained by curing in the atmosphere.

The above-mentioned toluene-diluted photo-curing composition (A) is coated for a thickness of 0.02 mm on a flat plane of the lenticular lens sheet with a gravure coater and dried at 120° C. for 5 minutes to volatilize toluene. This adjusts the coated thickness of the photo-curing composition (A) for 0.001 mm. The above lenticular lens sheet is exposed UV-light in almost parallel from the side of the convex cylindrical lens with a high-pressure mercury lamp under the air. Then, the lenticular lens sheet is exposed UV-light from the side of the flat plane of the lenticular lens sheet as submerged in water.

The resultant lenticular lens sheet is attached in the flat plane with a PET film substrate where pre-sensitized (PS) plate offset printing UV-curing ink (FD Karton pitch) available from Toyo Ink Mfg. Co., Ltd. is painted with a thickness of 0.003 mm. UV-light is radiated from the high-pressure mercury lamp to the lens sheet from the PET film substrate to dry the PS plate offset printing UV-curing ink. Then, the polyethylene terephthalate film substrate is peeled to selectively remove black paint in the light condensing portion. Then, a shielding pattern is obtained without any axial misalignment at front and rear sides. When installed in the liquid crystal type projection TV, the lenticular lens sheet having the shielding pattern provides excellent images.

Example 2

A microlens array sheet is produced via the 2P molding with a lens forming roll engraved with a negative shape of a microlens array which is constituted of microlenses having a pitch of 0.15 mm. A substrate film utilizes a 0.125 mm thick PET film (COSMOSHINE A4300) available from TOYOBO Co., Ltd. and a 2P resin utilizes an acrylate UV-curing resin (Aronix) available from Toagosei Co., Ltd.

100 weight parts of pentaerythrytol triacrylate "Aronix M-305" (trade name; product by TOAGOSEI CO.,LTD.) and 3 weight parts of 1-hydroxy-1-cyclohexyl-phenyl-ketone "Irugacure 184" (trade name; product by Chiba Speciality Chemicals Inc.), were mixed to manufacture a photo-curing resin composition (a). The photo-curing resin composition (a) is measured to have a surface free energy of 46.8 mN/m according to the Wilhelmy method. The photo-curing resin composition (a) is added with 1 weight part of fluorine-based block polymer as the compound (b) of low surface free energy to produce a photo-curing composition (A). The fluorine-based block polymer is Modiper F200 available from NOF Corporation, and measured to have a surface free energy of 18.6 mN/m according to the Wilhelmy method. The photo-curing composition (A) is diluted into a concentration of 10 wt % with methyl ethyl ketone since it shows poor workability with regard to coating ability due to high viscosity. The diluted photo-curing composition (A) is coated with a thickness of 0.01 mm on a PET film, and then methyl ethyl ketone is volatilized to uniformly apply the photo-curing composition (A) with a thickness of 0.001 mm on the PET film. The PET film is cured in the same manner as in Example 1. The surface free energy there of is measured as 20.3 mN/m at atmospheric curing and 52.3 mN/m at aqueous curing.

The above-mentioned photo-curing composition (A) diluted with methyl ethyl ketone is coated with a thickness of 0.03 mm on the microlens array sheet. The sheet is dried at 80° C. for 5 minutes to volatilize methyl ethyl ketone to reduce the coated thickness of the photo-curing composition (A) into 0.003 mm. Almost parallel UV-light is radiated to the microlens array sheet from the side of the microlenses with a high-pressure mercury lamp in the air.

Screen printing UV-curing ink (UVPAL911) available from Teikoku Printing Inks Mfg. Co., Ltd. is applied to the flat plane side of the resultant microlens sheet with a thickness of 0.01 mm. The screen printing UV-curing ink is repelled from the light condensing portion to expose the layer of the photo-curing composition (A). After a sufficient time period that the screen printing UV-curing ink is selectively attached to portions except the condensing portion, the screen printing UV-curing ink is dried with a high-pressure mercury lamp. Then, a shielding pattern is obtained without any axial misalignment at front and rear sides. When installed in the liquid crystal type projection TV, the microlens array sheet having the shielding pattern provides excellent images enlarged with the angular field not only in horizontal direction but also in vertical direction in respect to an observer.

Example 3

A lenticular lens sheet is produced via the 2P molding with a lens-forming roll engraved with a negative shape of the lenticular lens which is constituted of convex cylindrical lenses having a pitch of 0.3 mm. A substrate film utilizes a 0.25 mm thick PET film (COSMOSHINE A4300) available from TOYOBO Co., Ltd. and a photo-curing resin utilizes an acrylate UV-curing resin (Aronix) available from Toagosei Co., Ltd.

60 weight parts of dipentaerythrytol hexa-acrylate "KAYARAD DPHA" (trade name; product by NIPPON KAYAKU CO.,LTD.), 40 weight parts of ethylene oxide-modified triacrylic isocyanurate "Aronix M-315" (trade name; product by TOAGOSEI CO.,LTD.), 1 weight part of 2,4-diethylthioxanthone (product by NIPPON KAYAKU CO.,LTD.) and 3 weight parts of 2-methyl-1-[4-(methylthio)phenyl]-2-morpholino propane-1-one "Irugacure 907" (trade name; product by Chiba Speciality Chemicals Inc.), were mixed to manufacture a photo-curing resin composition (a). The surface free energy of the photo-curing resin composition (a) was measured by the Wilhelmy method and found to be 42.6 mN/m. The photo-curing resin composition (a) is added with 0.5 weight parts of a low surface free energy compound (b) to produce a photo-curing composition (A). The low surface free energy compound (b) utilizes amino-denatured silicon oil (KF857) having the surface free energy 20.7 mN/measured via the Wilhelmy method, available from Shin-Etsu Chemical Co., Ltd. The photo-curing composition (A) is diluted into a concentration of 5 wt % with toluene since it shows poor workability with regard to coating ability due to high viscosity.

The toluene-diluted photo-curing composition (A) is coated for a thickness of 0.02 mm on a flat plane of the lenticular lens sheet with a gravure coater and dried at 120° C. for 5 minutes to volatilize toluene. This adjusts the painted thickness of the photo-curing composition (A) for 0.001 mm.

The above lenticular lens sheet is exposed UV-light in almost parallel from the side of the convex cylindrical lens with a high-pressure mercury lamp under a nitrogen atmosphere. Then, the lenticular lens sheet is exposed UV-light from the side of the flat plane of the lenticular lens sheet as submerged in water.

PS plate offset printing UV-curing ink (FD Karton pitch) available from Toyo Ink Mfg. Co., Ltd. is applied on the flat plane of the resultant lenticular lens sheet with a thickness of 0.003 mm. The screen printing UV-curing ink is repelled from the light condensing portion to expose the layer of the photo-curing composition (A). After a sufficient time period that the screen printing UV-curing ink is selectively attached to portions except the condensing portion, the screen printing UV-curing ink is dried with a high-pressure mercury lamp. Then, a shielding pattern is obtained without any axial misalignment at front and rear sides. When installed in the liquid crystal type projection TV, the lenticular lens sheet having the shielding pattern provides excellent images.

Example 4

A lenticular lens sheet is produced via the extrusion molding of methyl methacrylate-styrene copolymer resin with a lens forming roll engraved with a negative shape of the lenticular lens sheet which is constituted of convex cylindrical lenses having a pitch of 0.3 mm.

70 weight parts of pentaerythrithol triacrylate (Aronix M-305) available from Toagosei Co., Ltd., 20 weight parts of hexanedioldiacrylate (KAYARAD R-167) available from Nippon Kayaku Co., Ltd. and 10 weight parts of acylphosphineoxide (Lucirin TPO) available from BASF Corporation to prepare a photo-curing resin composition (a). The photo-curing resin composition (a) is measured to have a surface free energy of 45.8 mN/m via the Wilhelmy method. The photo-curing resin composition (a) is added with a low surface free energy compound (b) of 8 weight parts to produce a photo-curing composition (A). The low surface free energy compound (b) is water/oil repellent (TG656) available from Daikin Industries, Ltd. and has a surface free energy of 18.6 mN/m measured according to the Wilhelmy method. The photo-curing composition (A) is diluted into a concentration of 20 wt % with a mixed solvent of isopropyl alcohol/hexane since it shows poor workability with regard to coating ability due to high viscosity.

The diluted photo-curing composition (A) is uniformly applied on the flat plane of the lenticular lens sheet with a gravure coater for a thickness of 0.02 mm. The sheet is dried at 60° C. for 1 minute to volatilize the mixed solvent thereby reducing the coated thickness of the photo-curing composition (A) into 0.004 mm.

A high-pressure mercury lamp is used to radiate parallel UV-light to the above described lenticular lens sheet from the side of the convex cylindrical lenses in the air. The resultant lenticular lens sheet is attached in the flat plane with a peelable PET film where screen printing UV-curing ink ("Daicure" SSD) available from Dainippon Ink & Chemicals, Inc. is painted with a thickness of 0.03 mm. Parallel UV-light is radiated to the lenticular lens sheet from the convex cylindrical lens side with a high-pressure mercury lamp. The peelable PET film is peeled from the resultant lenticular lens sheet to form a shielding pattern without any axial misalignmnet at front and rear sides. When installed in the liquid crystal type projection TV, the lenticular lens sheet having the shielding pattern provides excellent images to the observer.

Comparative Example 1

A lenticular lens sheet is produced via the 2P molding with a lens-forming roll engraved with a negative shape of the lenticular lens which is constituted of convex cylindrical lenses having a pitch of 0.3 mm. A substrate film utilizes a 0.25 mm thick PET film (COSMOSHINE A4300) available from TOYOBO Co., Ltd. and a 2P resin utilizes an acrylate UV-curing resin (Aronix) available from Toagosei Co., Ltd.

60 weight parts of dipentaerythrytol hexa-acrylate "KAYARAD DPHA" (trade name; product by NIPPON KAYAKU CO.,LTD.), 40 weight parts of ethylene oxide-modified triacrylic isocyanurate "Aronix M-315" (trade name; product by TOAGOSEI CO.,LTD.), 1 weight part of 2,4-diethylthioxanthone (product by NIPPON KAYAKU CO.,LTD.) and 3 weight parts of 2-methyl-1-[4-(methylthio)phenyl]-2-morpholino propane-1-one "Irugacure 907" (trade name; product by Chiba Speciality Chemicals Inc.), were mixed to manufacture a photo-curing resin composition (a). The surface free energy of the photo-curing resin composition (a) was measured by the Wilhelmy method and found to be 42.6 mN/m. The photo-curing resin composition (a) is diluted into a concentration of 5 wt % with toluene since it shows poor workability with regard to coating ability due to high viscosity. The diluted photo-curing resin composition (a) is uniformly applied with a thickness of 0.001 mm on a PET film by volatilizing the toluene, after coating the photo-curing resin composition (a) on the PET film with a thickness of 0.02 mm by using the bar coater. The resultant film is halved: One is in the air and the other one is submerged into water, then they are UV-radiated with a high-pressure mercury lamp. In the resultant film, contact angles of the surface are measured in respect to various solvents with a contact angle meter available from Kyowa Interface Science Co., Ltd. Results are shown in Table 2.

TABLE 2

| Curing environment | Solvent | | | |
| --- | --- | --- | --- | --- |
| | Water | Ethylene glycol | Dipropylene glycol | Toluene |
| Atmosphere | 76° | 40° | 0° | 0° |
| Water | 68° | 30° | 0° | 0° |

Surface free energy of solvents, $\gamma_L$

Water: 72.8 mN/m ($\gamma_L^a$: 29.1 mN/m, $\gamma_L^b$: 1.3 mN/m, $\gamma_L^c$: 42.4 mN/m)

Ethylene glycol: 47.7 mN/m ($\gamma_L^a$: 30.1 mN/m, $\gamma_L^b$: 0 mN/m, $\gamma_L^c$: 17.6 mN/m)

Dipropylene glycol: 33.9 mN/m ($\gamma_L^a$: 29.4 mN/m, $\gamma_L^b$: 0 mN/m, $\gamma_L^c$: 4.5 mN/m)

Toluene: 27.9 mN/m ($\gamma_L^a$: 27.9 mN/m, $\gamma_L^b$: 0 mN/m, $\gamma_L^c$: 0 mN/m)

(All values at 20° C. From Journal of Adhesion, 8,131 (1972).

From the results of Table 2, the surface free energies when curing was performed in the atmosphere and when it was performed in water were respectively computed to be 39.6 mN/m and 42.3 mN/m. Therefore, the photo-curing resin composition (a) to which the compound (b) of low surface free energy was not added, did not show different surface free energies even if it was cured in different environments.

The above-mentioned toluene-diluted photo-curing resin composition (a) is coated for a thickness of 0.02 mm on a flat plane of the lenticular lens sheet with a gravure coater and dried at 120° C. for 5 minutes to volatilize toluene. This adjusts the coated thickness of the photo-curing resin composition (a) for 0.001 mm. The above lenticular lens sheet is exposed UV-light in almost parallel from the side of the convex cylindrical lens with a high-pressure mercury lamp under the air. Then, the lenticular lens sheet is exposed UV-light from the side of the flat plane of the lenticular lens sheet as submerged in water.

The resultant lenticular lens sheet is attached in the flat plane with a PET film substrate where PS plate offset printing UV-curing ink (FD Karton pitch) available from Toyo Ink Mfg. Co., Ltd. is painted with a thickness of 0.003 mm. UV-light is radiated to the lenticular lens sheet from the PET film substrate with a high-pressure mercury lamp to dry the PS plate offset printing UV-curing ink. Any shielding pattern is not obtained after the PET film is peeled from the lens sheet. Moreover, the PS plate offset printing UV-curing ink is attached to both sides of the lenticular lens sheet and the PET film substrate.

Example 5

A fresnel lens sheet is produced via the 2P molding with a fresnel lens forming mold engraved with a negative shape of the fresnel lens sheet with a pitch of 0.1 mm and a lens height of 0.1 mm. The substrate film utilizes a PET film (COSMOSHINE A4300) having a thickness of 0.25 mm available from TOYOBO Co., Ltd and the 2P forming resin utilizes an acrylic UV-curing resin (Aronix) available from Toagosei Co., Ltd.

100 weight parts of pentaerythrytol triacrylate "Aronix M-305" (trade name; product by TOAGOSEI CO.,LTD.) and 3 weight parts of 1-hydroxy-1-cyclohexyl-phenyl-ketone "Irugacure 184" (trade name; product by Chiba Speciality Chemicals Inc.), were mixed to manufacture a photo-curing resin composition (a). The photo-curing resin composition (a) is measured to have a surface free energy of 46.8 mN/m according to the Wilhelmy method. The photo-curing resin composition (a) is added with 1 weight part of fluorine-based block polymer as the compound (b) of low surface free energy to produce a photo-curing composition (A). The fluorine-based block polymer is Modiper F200 available from NOF Corporation, and measured to have a surface free energy of 18.6 mN/m according to the Wilhelmy method. The photo-curing composition (A) is diluted into a concentration of 10 wt % with methyl ethyl ketone since it shows poor workability with regard to coating ability due to high viscosity. The diluted photo-curing composition (A) is coated with a thickness of 0.001 mm on a PET film with a bar coater. Methyl ethyl ketone is volatilized to produce a film of the photo-curing composition (A) with a uniform thickness of 0.001 mm on the PET film. The resultant film is cured by radiating UV-light thereto in the air or water, and then the surface free energy thereof is measured in the same manner as in Example 1. The surface free energy is 20.3 mN/m at atmospheric curing and 52.3 mN/m at aqueous curing.

The above-mentioned photo-curing composition (A) diluted with methyl ethyl ketone is coated with a thickness 0.03 mm on a radiation plane side of the fresnel lens sheet with a spin coater. The fresnel lens sheet is dried at 80° C. for 5 minutes to volatilize methyl ethyl ketone to reduce the coated thickness of the photo-curing composition (A) into 0.003 mm. The resultant fresnel lens sheet is UV-radiated from the incidence plane side in the air with a high-pressure mercury lamp that can be regarded as a point light source.

Screen printing UV-curing ink (UVPAL911) available from Teikoku Printing Inks Mfg. Co., Ltd. is painted on the radiation plane side of the resultant fresnel lens sheet for a thickness of 0.01 mm with a spin coater. The screen printing UV-curing ink is repelled from the fresnel lens faces to expose the layer of the photo-curing composition (A). After a sufficient time period that the screen printing UV-curing ink is selectively attached to the rising faces, the screen printing UV-curing ink is dried with a high-pressure mercury lamp to produce a shielding pattern only on the rising faces. When installed in the projection TV, the fresnel lens sheet provides excellent images with reduced quantity of noise light.

As set forth above, the invention allows the lenticular lens sheet or microlens array sheet applicable to the screen for the pixel type projection TV characterized in high quality and definition to have the shielding layer without any axial misalignment at front and rear sides as well as provides the simple producing method of the lens sheet. Further, the shielding layer can be selectively formed on the rising faces of the fresnel lens sheet. The resultant fresnel lens sheet reduces the stray light and provides excellent images improved in contrast to the observer.

What is claimed is:

1. A lens sheet comprising a lens portion with a plurality of lens elements arranged in at least one side and a shielding layer provided in a non-transmitting portion of a light radiation plane of the lens sheet, wherein the shielding layer is provided on a layer made of a cured photo-curing composition (A), wherein the photo-curing composition (A) is composed of 100 weight parts of photo-curing resin composition (a) having a surface free energy of 30 mN/m or more and 0.01 to 10 weight parts of compound (b) having a surface free energy of 25 mN/m or less.

2. A lens sheet comprising a lens portion with a plurality of lens elements arranged in at least one side and a shielding layer provided in a non-transmitting portion of a light radiation plane, wherein the shielding layer is provided on a layer made of a cured photo-curing composition (A), wherein a light-transmitting portion in the layer of the photo-curing composition (A) has a surface free energy of 25 mN/m or less.

3. The lens sheet according to claim 1, wherein a lens portion of the lens sheet is a group of convex cylindrical lenses one-dimensionally arrayed on a light incidence plane.

4. The lens sheet according to claim 1, wherein the lens portion of the lens sheet is a group of convex lenses two-dimensionally arrayed on a light incidence plane.

5. A method of producing a lens sheet which includes a lens portion with a plurality of lens elements arranged in at least one side and a shielding layer provided in a non-transmitting portion of a light radiation plane of the lens sheet, the method comprising the following steps of:
   coating a photo-curing composition (A) on a light radiation plane of the lens sheet to form a layer made of the photo-curing composition (A), the photo-curing composition (A) being composed of 100 weight parts of a photo-curing resin composition (a) having a surface free energy of 30 mN/m or more and 0.01 to 10 weight parts of a compound (b) having a surface free energy of 25 mN/m or less;
   radiating light from the side opposite to the layer of the photo-curing composition (A) to selectively cure a light transmitting portion of the layer of the photo-curing composition (A) with the layer of the photo-curing composition (A) being contacted with a medium having free energy lower than that of the compound (b); and
   painting colored pigment on the layer of the photo-curing composition (A) to form a shielding layer in a non-transmitting portion of light.

6. The method of producing a lens sheet according to claim 5, wherein the formation of said shielding layer comprising the steps of:
   painting the colored pigment; and
   drying the colored pigment after a time period lapses as much as the colored pigment painted on the light transmitting portion is repelled to completely expose the layer of the photo-curing composition (A) in the light transmitting portion.

7. The method of producing a lens sheet according to claim 5, wherein the formation of said shielding layer comprises the steps of:
   painting the colored pigment;
   drying the colored pigment; and
   removing the colored pigment on the light transmitting portion.

8. The method of producing a lens sheet according to claim 5, wherein the formation of said shielding layer comprising the steps of:
   painting photo-curing colored pigment on a peelable sheet;
   attaching a layer of the photo-curing colored pigment and the layer of the photo-curing composition (A) to each other; and
   radiating light from the side opposite to the layer of the photo-curing colored pigment and the photo-curing composites (A) to selectively cure a light transmitting portion of the photo-curing colored pigment; and peeling the peelable sheet from the lens sheet.

9. The method of producing a lens sheet according to claim 5, wherein the medium having a surface free energy lower than that of the compound (b) is the air.

10. The method of producing a lens sheet according to claim 5, wherein the photo-curing composition (A) is contacted with a medium having a surface free energy higher than that of the photo-curing resin composition (a) and the medium is water.

11. The method of producing a lens sheet according to claim 5, wherein the light radiated from the side opposite to the layer of the photo-curing composition (A) propagates substantially in a parallel direction.

12. The method of producing a lens sheet according to claim 5, wherein the lens sheet is used for a projection screen for an image display device which displays an image by projecting light from rearward, and the light radiated from the side opposite to the layer of the photo-curing composition (A) propagates substantially in the same direction as that of the projection light of the image.

13. The lens sheet according to claim 2, wherein the lens portion of the lens sheet is a group of convex cylindrical lenses one-dimensionally arrayed on a light incidence plane.

14. The lens sheet according to claim 2, wherein the lens portion of the lens sheet is a group of convex lenses two-dimensionally arrayed on a light incidence plane.

15. The lens sheet according to claim 2, wherein the lens portion of the lens sheet is a fresnel lens constituted of fresnel lens faces and rising faces, wherein the fresnel lens faces are obtained by dividing the light radiation plane into the shape of a number of concentric circles and the rising faces each define boundaries of the fresnel lens faces.

16. The lens sheet according to claim 1, wherein a first portion of the cured photo-curing composition (A) is cured in water and a second portion is cured in the atmosphere.

17. The method according to claim 5, wherein a first portion of the photo-curing composition (A) is under water during curing and a second portion is in the atmosphere.

18. The lens sheet according to claim 1, wherein the photo-curing resin composition (a) has a surface free energy of 40 mN/m or more.

19. The lens sheet according to claim 1, wherein the compound (b) has a surface free energy of 20 mN/m or less.

20. The method according to claim 5, wherein the photo-curing resin composition (a) has a surface free energy of 40 mN/m or more.

21. The method according to claim 5, wherein the compound (b) has a surface free energy of 20 mN/m or less.

22. The lens sheet according to claim 1, wherein the layer made of the cured photo-curing composition (A) has one or more high surface free energy areas and one or more low surface free energy areas.

23. The method according to claim 5, wherein the radiating is carried to form a lens sheet having one or more high surface free energy areas and one or more low surface free energy areas.

24. The lens sheet according to claim 1, wherein the layer made of the cured photo-curing composition (A) has areas of different surface contact angles.

25. The lens sheet according to claim 1, wherein the layer made of the photo-curing composition (A) has one or more regions of high surface free energy and one or more regions of low surface free energy, wherein the difference in surface free energy between the high surface free energy area and the low surface free energy area is 20 mN/m or more.

26. The method according to claim 5, wherein the radiating forms at least one area having a high surface free energy and at least one area having a low surface free energy, wherein the difference in surface free energy between the high surface free energy area and the low surface free energy area is 20 mN/m or more.

27. The lens sheet according to claim 1, wherein the photo-curing composition (A) consists essentially of the photo-curing resin composition (a) and the compound (b).

28. The method according to claim 5, wherein the photo-curing composition (A) consists essentially of the photo-curing resin composition (a) and compound (b).

29. The lens sheet according to claim 1, wherein the compound (b) is present in an amount of from 3 to 10 weight parts in the photo-curing composition (A).

30. The method according to claim 5, wherein the compound (b) is present in an amount of from 3 to 10 weight parts.

* * * * *

UNITED STATES PATENT AND TRADEMARK OFFICE
CERTIFICATE OF CORRECTION

PATENT NO. : 6,992,831 B2
DATED : January 31, 2006
INVENTOR(S) : Nagasawa et al.

It is certified that error appears in the above-identified patent and that said Letters Patent is hereby corrected as shown below:

<u>Title page,</u>
Item [30], should read:
-- (30)      Foreign Application Priority Data
         Jun. 13, 2001   (JP) …………………….. 2001-177875
         Feb. 22, 2002   (JP) …………………….. 2002-046514 --.

Signed and Sealed this

Fourth Day of April, 2006

JON W. DUDAS
*Director of the United States Patent and Trademark Office*